United States Patent [19]

Kanbayashi et al.

[11] Patent Number: 6,114,412
[45] Date of Patent: Sep. 5, 2000

[54] WATER-BASED INK WITH METALLIC GLOSS FOR DIRECT FILL IN BALL-POINT PEN

[75] Inventors: Hironobu Kanbayashi; Teruaki Fukasawa, both of Gumma, Japan

[73] Assignee: Kabushiki Kaisha Pilot, Japan

[21] Appl. No.: 09/371,832

[22] Filed: Aug. 11, 1999

Related U.S. Application Data

[63] Continuation of application No. 08/951,756, Oct. 16, 1997, abandoned.

[30] Foreign Application Priority Data

Oct. 18, 1996 [JP] Japan ............... 8-311150

[51] Int. Cl.$^7$ ............ C09D 11/18; C08K 9/04; C08K 5/09; C08K 5/053; C08K 3/08
[52] U.S. Cl. ............ 523/161; 523/205; 524/320; 524/386; 524/441
[58] Field of Search ............ 523/160, 161, 523/200, 205; 524/320, 386, 441

[56] References Cited

U.S. PATENT DOCUMENTS

| | | | |
|---|---|---|---|
| 5,104,922 | 4/1992 | Chang | 524/441 |
| 5,474,603 | 12/1995 | Miyashita et al. | 106/25 R |
| 5,691,033 | 11/1997 | Davies | 524/441 |
| 5,712,328 | 1/1998 | Inoue et al. | 523/161 |
| 5,767,172 | 6/1998 | Fukusawa | 523/161 |

FOREIGN PATENT DOCUMENTS

| | | | |
|---|---|---|---|
| 0 837 113 | 4/1998 | European Pat. Off. | |
| 4025264 | 1/1992 | Germany | 524/441 |
| 62-568 | 1/1987 | Japan | 523/161 |
| 63-072771A | 4/1988 | Japan . | |
| 63-234074 | 9/1988 | Japan | 523/161 |
| 2-69580 | 3/1990 | Japan | 524/441 |
| 07216284A | 8/1995 | Japan . | |
| 08199108A | 8/1996 | Japan . | |

*Primary Examiner*—Peter A. Szekely
*Attorney, Agent, or Firm*—Rader, Fishman & Grauer

[57] ABSTRACT

There is provided a water-based ink comprising: 1–15% by weight of aluminum powder; 10–40% by weight of a humectant; 0.05–0.5% by weight of a chelating agent; 0.1–0.5% by weight of a cross-linkable acrylic acid polymer having a number average molecular weight in the range of 3,000,000–5,000,000; 30–80% by weight of water; 2–8% by weight of a dispersant; and 0.2–1.5% by weight of a anti-corrosive lubricant.

22 Claims, No Drawings

WATER-BASED INK WITH METALLIC GLOSS FOR DIRECT FILL IN BALL-POINT PEN

This application is continuation of application Ser. No. 08/951,756, filed Oct. 16, 1997, now abandoned.

BACKGROUND OF THE INVENTION

1. Field of the Invention

This invention generally relates to a water based ink exhibiting a metallic gloss (sometimes referred to as metallic color) which is capable of being used for directly filling a cylindrical chamber of a ball-point pen. More particularly, the present invention relates to a water-based ball-point pen grade ink which may possess a metallic gloss of gold, silver, etc.

2. Description of Related Art

Inks possessing a metallic gloss have been disclosed in, for example, JP-A-61-123,684, JP-A-63-95,277, and JP-A-04-126,782. However, these inks exhibit such problems as they invariably have a very low viscosity and are often incapable of preventing settling of metallic powder having a high specific gravity. Therefore, when the inks of the prior art are used, vibration or agitation is generally required prior to use.

In JP-A-07-145,339, in one example, a polysaccharide such as guayule gum or xanthan gum (which can provide a shear thinning property to the ink) is disclosed as being added to an ink in order to prevent settling of metallic powder. The metal ions that dissociate from the metallic powder react with the natural polysaccharide (a macromolecular viscosity enhancer) which eventually induces serious addition to the viscosity of the ink by aging, that is, the ink becomes more viscous over time.

A natural polysaccharide generally has a smaller yield value than a synthetic macromolecular substance. Thus, when a synthetic macromolecular substance is used as a viscosity enhancer, the settling of a metallic power cannot be completely prevented, even when the viscosity of the ink is set at a high level and the specific gravity of the metallic powder exceeds the yield value. Yield value is generally understood as the value of sheer force required to transfer an ink from a gel state into a sol state. Further, even when a natural macromolecular substance is used as a viscosity enhancer, since the yield value thereof is small, the settling of the metallic powder cannot be inhibited unless the viscosity of the ink is extremely high. Setting the viscosity at high level requires an increase in the amount of the natural macromolecular substance added. Most macromolecular viscosity enhancers, as known in the art, exhibit a film-forming property due to the evaporation of water from water-based inks. The film-forming property of macromolecular viscosity enhancers and the copiousness of the ink lead to solidification of the ink at the tip of the pen, thus seriously inhibiting smooth flow of the ink from the pen.

SUMMARY OF THE INVENTION

An object of the invention is to provide an ink possessing metallic gloss which inhibits the settling of a metallic powder even at low viscosity, precludes the formation of a film at the tip of the pen, and improves the initial outflow of the ink from the pen even after the pen has remained uncapped.

The object of the invention can be achieved by providing: a water based ink comprising: 1–15% by weight of an aluminum powder; 10–40% by weight of a humectant; 0.05–0.5% by weight of a chelating agent; 0.1–0.5% by weight of a cross-linkable acrylic acid polymer of a number average molecular weight in the range of about 3,000,000–5,000,000; 30–80% by weight of water; 2–8% by weight of a dispersant; and 0.2–1.5% by weight of an anticorrosive lubricant.

DETAILED DESCRIPTION OF THE INVENTION

The present invention provides an ink suitable for use in a ball-point pen that retains stability to resist the effect of aging, exhibits excellent behaviors for writing, and possesses metallic gloss. The ink of the present invention may optionally incorporate therein a pH modifier and/or a fungicide, and the ink preferably exhibits a yield value in the range of 0.5–3.0 Pa. As referred to herein, "yield value" is the value of sheer force required to transfer an ink from a gel state into a sol state. That is, ink begins to flow when the ink forms a sol state. Thus writing can only be satisfactorily achieved when ink is in a sol state. Yield value therefore is the force required to transfer an ink in the gel state to a sol state upon commencement of a writing operation.

The aluminum powder of the water-based ink, preferably comprises spherical or flaky particles, 5 $\mu$m–30 $\mu$m in particle size.

The chelating agent of the water based ink, preferably comprises one or more members selected from the group consisting of lactic acid, tartaric acid, and citric acid.

A water-based ink optionally further comprises about 5–20% by weight of a pigment. This optional pigment of the water-based ink, if employed, may be selected for example, from the group consisting of yellow pigment, blue pigment, green pigment, and red pigment.

The present invention is directed to a water-based ink with metallic gloss. Unlike conventional similar inks, the present ink substantially prevents settling of aluminum powder, causes substantially no change in composition, and confers excellent ink behavior when used with a ball-point pen.

The present invention preferably uses at least one cross-linkable acrylic acid polymer for preventing the tip of the pen from forming a film due to water evaporation. This is possible, at least in part, due to the fact the cross-linkable acrylic acid polymer does not form a film. Therefore, the ink exhibits an outstanding ability to flow out of the pen, even after the pen has remained uncapped.

The present invention attains formation of an ink of high yield value by preferably incorporating into the ink about 0.1–0.5% by weight of a cross-linkable acrylic acid polymer having a number average molecular weight in the range of about 3,000,000–5,000,000. When the cross-linkable acrylic acid polymer has a low yield value, it can tend to fluidize, even under small shear stress and induces settling of aluminum powder. When the acrylic acid polymer has a high yield value, the polymer can substantially prevent the settling of aluminum powder because it does not fluidize unless it is exposed to stress exceeding the yield value. The yield value of an ink according to the present invention is preferably in the range of about 0.5–5.0 Pa (the magnitude determined by a rheometer, produced by Thermal Analysis Corp. and marketed under product code of "CSL-100," at 20° C.). If the yield value is less than about 0.5 Pa, the settling of aluminum powder may not be sufficiently prevented. If the yield value exceeds about 3.0 Pa, the ink may be deficient in fluidity and may not permit ample outflow necessary for writing. However, yield values from about 3.0 and 5.0 Pa are also possible.

If the molecular weight of the cross-linkable acrylic acid polymer is less than about 3,000,000, settling of aluminum powder may occur because the metal ions produced by over time decompose the polymer, thus lowering the yield value of the polymer. In addition, if the molecular weight is less than about 3,000,000, the chelating agent may to some extent be less efficient in preventing settling. On the other hand, if the molecular weight exceeds about 5,000,000, the ink may not be able to resist the effect of aging because the it may not be possible to uniformly disperse the cross-linkable acrylic acid polymer in the ink.

If the amount of the cross-linkable acrylic acid polymer to be incorporated is less than about 0.1% by weight, a yield value which can prevent settling of aluminum powder may be difficult to obtain. If the amount exceeds about 0.5% by weight, the ink may possibly exhibit too high of a yield value, which in turn, may prevent sufficient outflow of the ink for writing.

The present invention preferably includes a chelating agent that may function to hinder the dissociated metal ions in the ink from reacting with the cross-linkable acrylic acid polymer. The use of a chelating agent therefore, substantially prevents degradation associated with viscosity and degradation of yield value due to aging.

The amount of the chelating agent to be incorporated is preferably in the range of about 0.05–0.5% by weight. If this amount is less than about 0.05% by weight, the reaction of the cross-linkable acrylic acid polymer with the dissociated metal ions may not be sufficiently prevented and the degradation of yield value by aging may occur.

Conversely, if this amount exceeds about 0.5% by weight, the excess chelating agent may prohibit the cross-linkable acrylic acid polymer from swelling, thereby, possibly adversely affecting the physical properties of the ink.

Examples of suitable chelating agents which exhibit a strong acid coordinating effect include organic acids such as lactic acid, tartaric acid, or citric acid An agent that exhibits a strong acid coordinating effect proves to be particularly suitable for use as a chelating agent. A chelating agent of this quality forms a chelate with metal ions and masks the effect of the metal ions.

An ink of the present invention preferably employs aluminum powder as a metal powder. This is because the incorporation of an aluminum powder allows formation of a water-based ink that possesses the metallic gloss of silver color. A water-based ink, when used as a basic ink and combined with a variety of pigments of a varying color, will generally easily produce an ink with metallic gloss corresponding to the color of the added pigment.

The aluminum powder reacts with water in the ink and generates hydrogen. Therefore, the aluminum powder should preferably be subjected to a surface treatment with a surfactant and a fatty acid, wherein the fatty acid coat formed is preferably incapable of reacting with water.

Preferably the aluminum powder may comprise spherical or flaky particles having an average particle size appropriately in the range of about 5 $\mu$m–30 $\mu$m. This particle size is an average diameter when the powder comprises spherical particles or an average surface diameter when the powder comprises flaky particles.

In order to prevent the ink from drying at the tip of the pen, a humectant may optionally be incorporated into the ink. If the amount of this agent to be incorporated is less than about 10% by weight, the agent may not exhibit substantial sufficient humidity action on the aluminum powder and further, may not provide a uniform dispersion of the aluminum powder to the desired extent. If the amount of humectant exceeds about 40% by weight, the agent may not sufficiently swell the cross-linkable acrylic acid polymer nor impart a sufficient yield value thereto. This, in turn, may result in a reduced inhibition of settling of the aluminum powder. Thus, the amount of humectant incorporated is preferred to be in the range of about 10–40% by weight.

Examples of suitable humectant include at least one water-soluble agent selected from the group consisting of ethylene glycol, propylene glycol, glycerin, diethylene glycol, triethylene glycol, dipropylene glycol, thiodiglycol, polyglycerin, polyethylene glycol, polypropylene glycol, methyl cellosolve, butyl cellosolve, methyl carbitol, and ethyl carbitol.

A dispersant is preferably incorporated into the ink for the purpose of improving the ability of the ink to resist the effect of aging, particularly for improving the dispersion of the aluminum powder and a pigment (if employed) in the ink. If the amount of the dispersant to be incorporated is less than about 2% by weight, the dispersant may not uniformly disperse the aluminum powder to the desired degree. If the amount exceeds about 8% by weight, the excess of the dispersant may possibly interfere with the swelling of the cross-linkable acrylic acid polymer. Therefore, the preferred amount of dispersant to be incorporated is in the range of about 2%–8% by weight.

A macromolecular dispersant or a nonionic surfactant is preferably used as the dispersant. Specifically, SOLSPERSE S20000 (Zeneca K. K.) a hyperdispersant comprising a two component structure, namely, a polymeric chain and an anchoring group and JOHNCRYL 1535, a styrene/acrylic copolymer (Johnson Polymer K. K.) are suitable examples of such dispersants.

The ink preferably includes a rustproofing agent because the ink is water based and the tip of the ball-point pen is often made of iron. The present ink also preferably includes a lubricant for the purpose of enabling the ball-point to rotate. Therefore, it is advantageous to use a anticorrosive lubricant that combines these two properties. If the amount of the anticorrosive lubricant to be incorporated is less than about 0.2% by weight, the additive may not impart sufficient lubricating qualities to the ink. As a result, the pen could be hampered from producing a suitable writing quality or forming fine lines. Therefore, the amount of anticorrosive lubricant is preferably in the range of about 0.2–1.5% by weight.

Examples of suitable anticorrosive lubricants include one or more compounds selected from the group consisting of phosphoric ester type surfactants, benzotriazole, and fatty esters.

Preferably, a pH modifier may be used for controlling the swelling of the cross-linking acrylic acid polymer.

Examples of suitable pH modifier that may be used in the present invention include one or more selected from the group consisting of monoethanol amine, diethanol amine, triethanol amine, N,N-dimethylethanol amine, N,N-diethanol amine, N-N-dibutyl ethanol amine, and N,N-methyldiethanol amine.

A fungicide may be used in the present ink to inhibit the growth of fungus in the ink, and also may improve the ability of the ink to resist the effect of aging.

Examples of suitable fungicide include 2,3-benzoisothiazolin-3-one, sodium benzoate, sodium dehydroacetate, or the like.

The incorporation of the aluminum powder generally imparts a metallic gloss of a silver color to the produced ink.

When a pigment is added to the ink of this silver color, it typically forms an ink of a metallic tone corresponding the pigment added.

The amount of optional pigment, if included, is preferably in the range of about 5% by weight–20% by weight. If this amount included is less than about 5% by weight, the pigment may not, exhibit perfect coloration. If the amount exceeds about 20% by weight, the pigment may cause the ink to dry and solidify quickly at the tip of the pen, thereby possibly impairing the initial outflow of the ink for writing.

When the pigment to be incorporated is yellow, the produced ink acquires a metallic gloss of gold color. Examples of suitable yellow pigments that may be used in accordance with the present invention include, Pigment Yellows 1, 3, 12, 93, 94, 109, etc.

When the pigment to be incorporated is blue, the produced ink acquires a metallic gloss of blue metallic tone. Examples of suitable blue pigments capable of being used in accordance with the present invention include, Pigment Blues 15, 16, 17, etc.

When the pigment to be incorporated is green, the produced ink acquires a metallic gloss of green metallic tone. Examples of useable green pigments suitable for use in accordance with the present invention include, Pigment Greens 7, 36, etc.

When the pigment to be incorporated is red, the produced ink acquires a metallic gloss of red metallic tone. Examples of suitable red pigments used in accordance with the present invention include, Pigment Reds 3, 5, 202, 122, 149, etc.

All references made herein to percentages by weight are based on the total weight of the ink unless stated otherwise.

EXAMPLES

Example 1

An ink of silver color was obtained by mixing all components of the following composition except the acrylic acid cross-linkable polymer together by intimately blending the mixture using a magnetic stirrer at 60° C. for about one hour. The acrylic acid cross-linkable polymer is then added to the resultant blend. The process continues by stirring the mixture using a homogenizer stirrer until thoroughly dispersed.

| Aluminum powder | 1.0% by weight |
| --- | --- |
| Ethylene glycol | 20.0% by weight |
| Lactic Acid | 0.2% by weight |
| Cross-linkable acrylic acid polymer B | 3% by weight |
| Deionized water | 71.3% by weight |
| Dispersant | 5.0% by weight |
| Anticorrosive Lubricant | 1.0% by weight |
| Fungicide | 0.2% by weight |
| Triethanol amine | 1.0% by weight |

A macromolecular dispersant (JOHNCRYL 1535; Johnson Polymer K. K.) was used as the dispersant.

1,2-Benzoisothiazolin-3-one (PROXEL XL-2; Zeneca K. K.) was used as the fungicide.

A phosphoric ester type surfactant (PLYSURF A-208S; Daiichi Kogyo K. K.) was used as the anticorrosive lubricant.

The produced ink of silver color was used for direct filling in a water based ball-point pen. The results are shown in Table 1.

Examples 2–10

Inks were obtained by following the procedure of Example 1 while using the ink compositions shown in Table 1. Example 8 produced an ink of gold color. The results are shown in Table 1.

TABLE 1

|  | 1 | 2 | 3 | 4 | 5 | 6 | 7 | 8 | 9 | 10 |
| --- | --- | --- | --- | --- | --- | --- | --- | --- | --- | --- |
| Aluminum powder | 1.0 | 15.0 | 10.0 | 10.0 | 10.0 | 10.0 | 10.0 | 5.0 | 10.0 | 10.0 |
| Pigment Yellow 3 (pigment |  |  |  |  |  |  |  | 15.0 |  |  |
| Humectant |  |  |  |  |  |  |  |  |  |  |
| Ethylene glycol | 20.0 | 20.0 | 10.0 | 40.0 | 20.0 | 20.0 | 20.0 | 20.0 | 20.0 | 20.0 |
| Propylene glycol |  |  |  |  |  |  |  |  |  |  |
| Glycerin |  |  |  |  |  |  |  |  |  |  |
| Deionized water | 71.3 | 57.3 | 72.3 | 42.3 | 62.5 | 62.0 | 62.3 | 52.2 | 62.5 | 62.1 |
| Anticorrosive lubricant | 1.0 | 1.0 | 1.0 | 1.0 | 1.0 | 1.0 | 1.0 | 1.0 | 1.0 | 1.0 |
| Triethanol amine | 1.0 | 1.0 | 1.0 | 1.0 | 1.0 | 1.0 | 1.0 | 1.0 | 1.0 | 1.0 |
| Dispersant | 5.0 | 5.0 | 5.0 | 5.0 | 5.0 | 5.0 | 5.0 | 5.0 | 5.0 | 5.0 |
| Fungicide | 0.2 | 0.2 | 0.2 | 0.2 | 0.2 | 0.2 | 0.2 | 0.2 | 0.2 | 0.2 |
| Lactic acid | 0.2 | 0.2 | 0.2 | 0.2 | 0.05 | 0.5 | 0.2 | 0.2 | 0.2 | 0.2 |
| Tartaric acid |  |  |  |  |  |  |  |  |  |  |
| Citric acid |  |  |  |  |  |  |  |  |  |  |
| cross linkable acrylic acid polymer B | 0.3 | 0.3 | 0.3 | 0.3 | 0.3 | 0.3 |  | 0.4 | 0.1 | 0.5 |
| cross linkable acrylic acid polymer C |  |  |  |  |  |  | 0.3 |  |  |  |
| Settling of metal powder | ⊙ | ○ | ⊙ | ⊙ | ⊙ | ⊙ | ⊙ | ⊙ | ○ | ⊙ |
| Stability of ink to resist the effect of aging | ⊙ | ⊙ | ○ | ⊙ | ○ | ○ | ⊙ | ⊙ | ○ | ⊙ |
| Property of initial outflow of ink | ○ | ○ | ○ | ⊙ | ○ | ⊙ | ⊙ | ⊙ | ⊙ | ○ |
| Writing property | ○ | ⊙ | ○ | ○ | ⊙ | ⊙ | ⊙ | ⊙ | ⊙ | ○ |

The aluminum powder used in the Examples is a powder (4010SW; Showa Aluminum K. K.) having an average particle diameter of about 20 µm wherein the surface was treated with a fatty acid.

The anticorrosive lubricant used in the Examples is a phosphoric ester type surfactant (PLYSURF A-208S; Daiichi Kogyo K. K.).

The fungicide used in the Examples is 1,2-benzoisothiazolin-3-one (PROXEL XL-2; Zeneca K. K.).

The dispersant used in the Examples is a macromolecular substance (Johncryl 1535; Johnson Polymer K. K.).

The cross-linkable acrylic acid polymer B used in the Examples is a cross-linkable acrylic acid polymer (HIVIS WAKO 104; Wako Pure Chemical Industries Ltd.) having a number average molecular weight of about 3,000,000.

The cross-linkable acrylic acid polymer C used in the Examples is a cross-linkable acrylic acid polymer having a number average molecular weight of about 5,000,000.

EVALUATION OF INK COMPOSITIONS

The settling of metallic powder was evaluated. This property is determined by securing a sample of 100 cc in volume from a given ink, centrifuging this sample for 10 minutes, visually observing the stirred ink, and rating the condition of the ink on the following four-point scale:

Separation-settling of metallic powder produced below 300 G . . . x

Separation-settling of metallic powder produced between 300 G–400 . . . Δ

Separation-settling of metallic powder produced between 400 G–600 . . . ○

No separation, settling of metallic powder produced even above 600 G . . . ⊙

Ability of the ink to resist the effect of aging was evaluated. This property was determined by allowing a given ink to stand at rest: in a closed glass vial under the experimental conditions of 50° C. and 0% RH and observing the ink observed under a microscope to determine the physical properties, rate the physical properties, and determine the condition of the ink on the following four-point scale:

Deposit formed in the ink or changes of not less than 30% occurring in physical properties as compared with initial levels within one month's standing . . . x Deposit formed in the ink or changes of not less than 30% occurring in physical properties as compared with initial levels after one–two months' standing . . . Δ

Deposit formed in the ink or changes of not less than 30% occurring in physical properties as compared with initial levels after two–three months' standing . . . ○

No deposit formed in the ink or changes of less than 30% occurring in physical properties as compared with initial levels after not less than three months' standing . . . ⊙

The property of initial outflow of ink was evaluated. This property was determined by allowing a given ball-point pen to lie at rest on the side in an uncapped state for one month under experimental conditions of 50° C. and 30% RH and subsequently cooling the pen to room temperature and thereafter using the pen to write a straight line and rating the outflow of the ink on the following four-point scale, wherein No straight line exceeding 10 cm obtained . . . x A complete straight line containing no obscure or discontinuous portion obtained within a distance of 5–10 cm . . . Δ

A complete straight line containing no obscure or discontinuous portion obtained within a distance of 3–5 cm . . . ○

A complete straight line containing no obscure or discontinuous portion obtained within a distance of not more than 3 cm . . . ⊙

Writing quality was evaluated. This property was determined by using a given pen for manual writing of a sample pattern and rating the produced pattern on the following four-point scale, wherein A perfect trace of ink containing no blurred or discontinuous portion obtained . . . ⊙

A trace of quality tolerable for practical purpose obtained . . . ○

A trace of rather inferior quality obtained . . . Δ

A trace of very inferior quality obtained . . . x

Examples 11–18

Inks were obtained by following the procedure of Example 1 while using the ink compositions shown in Table 2. The results are shown in Table 2.

TABLE 2

|  | Example | | | | | | | |
|---|---|---|---|---|---|---|---|---|
|  | 11 | 12 | 13 | 14 | 15 | 16 | 17 | 18 |
| Aluminum powder | 10.0 | 10.0 | 10.0 | 10.0 | 10.0 | 10.0 | 10.0 | 10.0 |
| Pigment Yellow 3 (pigment) | | | | | | | | |
| Humectant | | | | | | | | |
| Ethylene glycol | 20.0 | 20.0 | 10.0 | 40.0 | 20.0 | 20.0 | | |
| Propylene glycol | | | | | | | 20.0 | |
| Glycerin | | | | | | | | 20.0 |
| Deionized water | 62.3 | 62.5 | 62.0 | 62.3 | 62.5 | 62.0 | 62.3 | 62.3 |
| Anticorrosive lubricant | 1.0 | 1.0 | 1.0 | 1.0 | 1.0 | 1.0 | 1.0 | 1.0 |
| Triethanol amine | 1.0 | 1.0 | 1.0 | 1.0 | 1.0 | 1.0 | 1.0 | 1.0 |
| Dispersant | 5.0 | 5.0 | 5.0 | 5.0 | 5.0 | 5.0 | 5.0 | 5.0 |
| Fungicide | 0.2 | 0.2 | 0.2 | 0.2 | 0.2 | 0.2 | 0.2 | 0.2 |
| Lactic acid | | | | | | | 0.2 | 0.2 |
| Tartaric acid | 0.2 | 0.05 | 0.5 | | | | | |
| Citric acid | | | | 0.2 | 0.05 | 0.5 | | |
| Cross Linkable acrylic acid polymer B | 0.3 | 0.3 | 0.3 | 0.3 | 0.3 | 0.3 | 0.3 | 0.3 |
| Cross Linkable acrylic acid polymer C | | | | | | | | |
| Settling of metal powder | ⊙ | ⊙ | ⊙ | ⊙ | ⊙ | ⊙ | ⊙ | ⊙ |
| Stability of ink to resist the effect of aging | ⊙ | ○ | ○ | ⊙ | ○ | ○ | ⊙ | ⊙ |
| Property of initial outflow of ink | ⊙ | ○ | ⊙ | ⊙ | ○ | ⊙ | ⊙ | ⊙ |
| Writing property | ⊙ | ⊙ | ⊙ | ⊙ | ⊙ | ⊙ | ○ | ○ |

The materials used and the method of evaluation adopted were the same as those shown in Table 1.

Comparative Examples 1–10

Inks of silver color were obtained by following the procedure of Example 1 while using the ink compositions shown in Table 3. The properties were shown in Table 3.

TABLE 3

|  | Comparative Example | | | | | | | | | |
|---|---|---|---|---|---|---|---|---|---|---|
|  | 1 | 2 | 3 | 4 | 5 | 6 | 7 | 8 | 9 | 10 |
| Aluminum powder | 0.05 | 20.0 | 10.0 | 10.0 | 10.0 | 10.0 | 10.0 | 10.0 | 10.0 | 10.0 |
| Ethylene glycol | 20.0 | 20.0 | 5.0 | 45.0 | 20.0 | 20.0 | 20.0 | 20.0 | 20.0 | 20.0 |
| Deionized water | 72.3 | 52.3 | 77.3 | 37.3 | 62.5 | 61.9 | 62.3 | 61.6 | 62.5 | 62.1 |
| Anticorrosive lubricant | 1.0 | 1.0 | 1.0 | 1.0 | 1.0 | 1.0 | 1.0 | 1.0 | 1.0 | 1.0 |
| Triethanol amine | 1.0 | 1.0 | 1.0 | 1.0 | 1.0 | 1.0 | 1.0 | 1.0 | 1.0 | 1.0 |
| Dispersant | 5.0 | 5.0 | 5.0 | 5.0 | 5.0 | 5.0 | 5.0 | 5.0 | 5.0 | 5.0 |
| Fungicide | 0.2 | 0.2 | 0.2 | 0.2 | 0.2 | 0.2 | 0.2 | 0.2 | 0.2 | 0.2 |
| Lactic acid | 0.2 | 0.2 | 0.2 | 0.2 | 0.2 | 0.6 | 0.2 | 0.2 | 0.2 | 0.2 |
| Cross-Linkable acrylic acid polymer A |  |  |  |  |  |  | 0.3 | 1.0 |  |  |
| Cross-Linkable acrylic acid polymer B | 0.3 | 0.3 | 0.3 | 0.3 | 0.3 | 0.3 |  |  |  |  |
| Xanthan gum |  |  |  |  |  |  |  |  |  |  |
| Cross-Linkable acrylic acid polymer D |  |  |  |  |  |  |  |  | 0.1 | 0.5 |
| Settling of metal powder | o | x | x | x | o | x | x | x | x | x |
| Stability of ink to resist the effect of aging | x | x | x | x | x | x | x | x | x | x |
| Property of initial outflow of ink | x | x | x | x | x | x | x | x | x | x |
| Writing property | x | x | x | x | x | x | x | x | x | x |

The materials used, except the cross-linkable acrylic acid polymer A which was a cross-linkable acrylic acid polymer having a number average molecular weight of 2,000,000 and the cross-linkable acrylic acid polymer D which was a cross-linkable acrylic acid polymer having a number average molecular weight of 6,500,000, and the method of testing adopted were the same as those shown in Table 1.

Comparative Examples 11–14

Inks of silver color were obtained by following the procedure of Example 1 while using the ink compositions shown in Table 4. The properties are shown in Table 4.

TABLE 4

|  | Comparative Example | | | |
|---|---|---|---|---|
|  | 11 | 12 | 13 | 14 |
| Aluminum powder | 10.0 | 10.0 | 10.0 | 10.0 |
| Ethylene glycol | 20.0 | 20.0 | 20.0 | 20.0 |
| Deionized water | 62.1 | 61.1 | 62.6 | 62.0 |
| Anticorrosive lubricant | 1.0 | 1.0 | 1.0 | 1.0 |
| Triethanol amine | 1.0 | 1.0 | 1.0 | 1.0 |
| Dispersant | 5.0 | 5.0 | 5.0 | 5.0 |
| Fungicide | 0.2 | 0.2 | 0.2 | 0.2 |
| Lactic acid | 0.2 | 0.2 | 0.2 | 0.2 |
| Cross-linkable acrylic acid polymer A |  |  |  |  |
| Cross-linkable acrylic acid polymer B |  |  | 0.05 | 0.6 |
| Xanthan gum | 0.5 | 1.5 |  |  |
| Cross-linkable acrylic acid polymer D |  |  |  |  |
| Settling of metal powder | X | Δ | X | o |
| Stability of ink to resist the effect of aging | X | Δ | X | X |
| Property of initial outflow of ink | X | X | X | X |
| Writing property | o | X | X | X |

The materials used and the method of evaluation adopted were the same as those shown in Table 1.

In Comparative Example 1, though no settling occurred due to the addition of aluminum powder in a small amount, a trace of ink showed poor tonality and insufficient metallic gloss; in addition, a trace of ink contained prominently obscure and discontinuous portions. Considering the fact that the ink had water as a main solvent, the viscosity of the ink increased due to evaporation of water at the tip of the pen. The ratio of cross-linkable acrylic acid polymer B in the ink increased as the viscosity increased. The capacity of ink flow decreased as a result of increasing solidification of ink from evaporation of water.

In Comparative Example 2, the ink inadequately suspended the metallic powder. Hence, settling of the aluminum powder occurred at the yield value of the ink because a large amount of aluminum powder was used. As a result of the solidified ink clogging the pen tip, the pen ceased producing a smooth outflow of ink.

In Comparative Example 3, the aluminum powder was not able to uniformly disperse in the ink. The ink exhibited agglomeration and settling of the aluminum powder due to an insufficient amount of ethylene glycol being added as a humectant, thus resulting in ineffective humidity action.

In Comparative Example 4, the ink exhibited a low yield value which induced settling because the excessive amount of ethylene glycol inhibited swelling of the cross-linkable acrylic acid polymer.

In Comparative Example 5, the amount of the lactic acid added as a chelating agent was small. Gradually dissociated metal ions reacted with the cross-linkable acrylic acid polymer to where the ink displayed an increase in viscosity. An increase in viscosity accompanied a poor outflow from the pen, even though the settling of the aluminum powder could be prevented.

In Comparative Example 6, the amount of the lactic acid added was large. The excess lactic acid impeded the swelling of the cross-linkable acrylic acid polymer to a point where the ink failed to acquire a sufficient yield value and induced settling of the aluminum powder.

In Comparative Example 7 and Comparative Example 8, the cross-linkable acrylic acid polymers had small molecular weights; as a result, the cross-linkable acrylic acid polymers gradually underwent decomposition because of the ineffective resistance to metallic ions. Even with the addition of lactic acid as a chelating agent, the ink failed to acquire a yield value high enough to prevent settling of the aluminum powder which lead to settling of the aluminum powder.

In Comparative Example 9 and Comparative Example 10, the cross-linkable acrylic acid polymers had large molecular weights; as a result, the cross-linkable acrylic acid polymers could not be uniformly swelled in the ink. Therefore, the ink exhibited poor ability to resist the effect of aging.

In Comparative Example 11 and Comparative Example 12 xanthan gum, a natural gum, was used as a viscosity enhancer for ink in the place of cross-linkable acrylic acid polymer. The xanthan gum exhibited a low yield value as compared with a cross-linkable acrylic acid polymer thereby inducing settling of the aluminum powder. When the amount of the xanthan gum to be added was increased, which enhanced the viscosity and elevated the yield value of the ink to prevent settling of aluminum powder as shown in Comparative Example 10, the ink exhibited degradation in a variety of properties and induced settling due to aging.

In Comparative Example 13, the amount of cross-linkable acrylic acid polymer added was small. Thus, the ink failed to acquire an effective yield value which lead to settling of the aluminum powder.

In Comparative Example 14, the amount of cross-linkable acrylic acid polymer added was large. The ink exhibited high viscosity and yield value, thereby managing to prevent settling of the aluminum powder. Nevertheless, the ink exhibited deterioration in properties and gradual induction of settling of the cross-linkable acrylic acid polymer occurred.

In Examples 1–18, the inks produced invariably exhibited outstanding properties.

The priority document, Japanese patent application 8-311150 filed Oct. 18, 1996 is incorporated herein in its entirety by reference.

What is claimed is:

1. A water-based ink comprising:
   1–15% by weight of aluminum powder;
   10–40% by weight of a humectant;
   0.05–0.5% by weight of a strongly acidic chelating agent;
   0.1–0.5% by weight of a cross-linkable acrylic acid polymer having a number average molecular weight in the range of 3,000,000–5,000,000;
   30–80% by weight of water;
   2–8% by weight of a dispersant; and
   0.2–1.5% by weight of an anticorrosive lubricant.

2. A water-based ink according to claim 1, wherein said aluminum powder comprises spherical or flaky particles, 5 $\mu$m–30 $\mu$m in particle size.

3. A water-based ink according to claim 1, wherein said chelating comprises at least one component selected from the group consisting of lactic acid, tartaric acid, and citric acid.

4. A water-based ink according to claim 1, further comprising a pH modifier and/or a fungicide.

5. A water-based ink according to claim 1, wherein said ink has a yield value in the range of about 0.5–3.0 Pa.

6. A water based ink according to claim 3, wherein said ink has a metallic gloss and is capable of being used as a direct filling ink for a ball-point pen.

7. A water-based ink according to claim 1, further comprising 5–20% by weight of a pigment.

8. A water-based ink according to claim 7, wherein said pigment is at least one member selected from the group consisting of yellow pigment, blue pigment, green pigment and red pigment.

9. A water-based ink according to claim 1, wherein said humectant is selected from the group consisting of ethylene glycol, propylene glycol, glycerin, diethylene glycol, triethylene glycol, dipropylene glycol, thiodiglycol, polyglycerin, polyethylene glycol, polypropylene glycol, methyl cellosolve, butyl cellosolve, methyl carbitol and ethyl carbitol.

10. A water-based ink according to claim 9, wherein said humectant is ethylene glycol.

11. A water-based ink according to claim 1, wherein said aluminum powder is surface-treated and exhibits substantially no reactivity with water.

12. A water-based ink according to claim 1, wherein said chelating agent is an organic acid.

13. A water-based ink according to claim 1, wherein said dispersant is a non-ionic surfactant.

14. A water-based ink according to claim 1, wherein said dispersant is a macromolecular dispersant.

15. A water-based ink according to claim 4, wherein said pH modifier is selected from the group consisting of monoethanol amine, diethanol amine, triethanol amine, N,N-dimethylethanol amine, N,N-diethanol amine, N-N-dibutyl ethanol amine, and N,N-methyldiethanol amine.

16. A water-based ink according to claim 4, wherein said anticorrosive lubricant is selected from the group consisting of phosphoric acid ester surfactants, benzotriazole, and fatty acid esters.

17. A water-based ink according to claim 4, wherein said anticorrosive lubricant is a phosphoric ester surfactant.

18. A water-based ink according to claim 1, wherein said fungicide is selected from the group consisting of 1,2-benzoisothiazolin-3-one, 2,3-benzoisothiazolin-3-one, sodium benzoate, and sodium dehydroacetate.

19. A water-based ink according to claim 18, wherein said fungicide is 2,3-benzoisothiazoli-3-one.

20. A water-based ink according to claim 1, wherein said cross-linkable acrylic acid polymer has a number average molecular weight of about 3,000,000 to about 5,000,000.

21. A process for preparing the water based ink of claim 1 comprising (i) blending the aluminum powder, the humectant, the chelating agent, the water, the dispersant, and the anticorrosive lubricant; (ii) adding the cross-linkable acrylic acid polymer; and (iii) homogenizing until said cross-linkable acrylic acid polymer is dispersed.

22. A process of claim 21, further comprising adding a pH modifier and a fungicide to step (i).

* * * * *